United States Patent
Niel (10) Patent No.: US 8,793,300 B2
(45) Date of Patent: Jul. 29, 2014

(54) MONTGOMERY MULTIPLICATION CIRCUIT

(75) Inventor: Michael Niel, Six fours les plages (FR)

(73) Assignee: INSIDE Secure, Aix-en-Provence Cedex 3 (FR)

( * ) Notice: Subject to any disclaimer, the term of this patent is extended or adjusted under 35 U.S.C. 154(b) by 304 days.

(21) Appl. No.: 13/444,109

(22) Filed: Apr. 11, 2012

(65) Prior Publication Data

US 2012/0265794 A1 Oct. 18, 2012

(30) Foreign Application Priority Data

Apr. 18, 2011 (FR) ...................................... 11 53357

(51) Int. Cl.
*G06F 7/00* (2006.01)
*G06F 7/38* (2006.01)

(52) U.S. Cl.
USPC .......................................... 708/603; 708/491

(58) Field of Classification Search
CPC ........ G06F 7/7443; G06F 7/722; G06F 7/728
USPC ................................................ 708/491, 603
See application file for complete search history.

(56) References Cited

U.S. PATENT DOCUMENTS

| | | | |
|---|---|---|---|
| 6,185,596 B1 | 2/2001 | Hadad et al. | |
| 7,543,011 B2 | 6/2009 | Yoon et al. | |
| 2003/0031316 A1* | 2/2003 | Langston et al. | 380/28 |
| 2003/0037087 A1 | 2/2003 | Rarick | |
| 2004/0167952 A1* | 8/2004 | Gueron et al. | 708/492 |
| 2004/0252829 A1 | 12/2004 | Son | |
| 2007/0233769 A1* | 10/2007 | Moshier et al. | 708/491 |

OTHER PUBLICATIONS

Montgomery, "Modular Multiplication Without Trial Division", Mathematics of Computation, vol. 44, No. 170, pp. 519-521 (1985).
Koç et al, "Analyzing and Comparing Montgomery Multiplication Algorithms", IEEE Micro, vol. 16, No. 3, pp. 1-18 (1996).
Kelley et al, "Very High Radix Scalable Montgomery Multipliers," Proceedings of the 9th International Database Engineering & Application Symposium (2005).
U.S. Appl. No. 13/444,125 by Niel, filed Apr. 11, 2012.
French Search Report issued Feb. 17, 2012 in FR Application No. 1153357.

(Continued)

*Primary Examiner* — Chuong D Ngo
(74) *Attorney, Agent, or Firm* — Panitch Schwarze Belisario & Nadel LLP (57) ABSTRACT

A circuit for calculating a sum of products, each product having a q-bit binary operand and a k-bit binary operand, where k is a multiple of q, includes a q-input carry-save adder (CSA); a multiplexer (10) by input of the adder, having four k-bit channels respectively receiving the value 0, a first ($Y_i$) of the k-bit operands, the second k-bit operand ($M_{[63:0]}$, $m_i$), and the sum of the two k-bit operands, the output of a multiplexer of rank t (where t is between 0 and q−1) being taken into account by the adder with a t-bit left shift; and each multiplexer having first and second path selection inputs, the bits of a first of the q-bit operands being respectively supplied to the first selection inputs, and the bits of the second q-bit operand being respectively supplied to the second selection inputs.

8 Claims, 4 Drawing Sheets

(56) References Cited

OTHER PUBLICATIONS

Bunimov et al, "A Complexity-Effective Version of Montgomery's Algorithm," Workshop on Complexity Effective Designs, ISCA '02, pp. 1-7 (2002).

Koç, "RSA Hardware Implementation," RSA Laboratories, pp. 1-30 (Aug. 1, 1995).

Fan et al, "A Modified High-Radix Scalable Montgomery Multiplier," 2006 IEEE International Symposium on Circuits and Systems, pp. 3382-3385 (2006).

* cited by examiner

MONTGOMERY MULTIPLICATION CIRCUIT

BACKGROUND OF THE INVENTION

Embodiments of the invention relate to the Montgomery algorithm to execute a modular multiplication, also called Montgomery multiplication, and in particular to an electronic circuit optimized to execute the product.

The Montgomery algorithm is described in "Modular Multiplication Without Trial Division", Peter Montgomery, Mathematics of Computation, vol. 44, pp. 519-521, 1985. According to the Montgomery algorithm, when it is applied to binary numbers, the following value needs to be calculated:

$$R = XY \cdot 2^{-L} \bmod M \quad (1)$$

Where R, X, Y and M are L-bit numbers. M is the modulo; it is odd and higher than X and Y.

This calculation is often used to execute modular exponentiations in encryption, where numbers are "big", i.e., the L-bit number is of several hundred, for example 512. The algorithm then allows calculations to be simplified by limiting the number of divisions and limiting the size of the intermediate multiplication results to the sizes of multiplicands.

The calculation may be implemented by bit-to-bit iterations according to the following loop:

```
R:= 0                                          (2)
for i between 0 and L-1 execute:
    m[i]:= (R + XY[i]) mod 2
    R:= (R + XY[i] + m[i]M)/2
end for
```

The index [i] refers to the bit of weight i. In the first step of the iteration, a bit $m_{[i]}$ is determined whose parity is equal to that of the sum $R+XY_{[i]}$. Thus, in the second step, as M is odd, the sum $R+XY_{[i]}+m_{[i]}M$ is even; its division by 2 (right shift) decreases the size of the result by 1 bit without losing significant bits. Normally, the sum of three L-bit numbers is a (L+2)-bit number maximum. As the module M is never chosen at the maximum value ($2^L-1$), and X and Y are each lower than M, the sum does not exceed L+1 bits, whereby each iteration supplies an L-bit number R.

The value R searched in the relationship (1) is supplied by the last iteration.

Various other iterative methods are described in Analyzing and Comparing Montgomery Multiplication Algorithms, Çetin Kaya Koø et al., IEEE Micro, 16(3): 26-33, June 1996.

These methods are a starting point to implement the calculations on a microprocessor, possibly assisted by an accelerator dedicated to Montgomery multiplication.

A difficulty encountered to implement these calculations on a microprocessor results from the fact that the size of the numbers is too large (for example 512 bits) in relation to the computing capacity of the microprocessor (for example 64 bits). The result is that each elementary operation is executed by accumulating partial results coming from the decomposition of large numbers into slices, the sizes of which are adapted to the microprocessor capacity. Such a slice will be hereinafter referred to as "digit" to make an analogy with the multiplication of decimal numbers.

U.S. Pat. Nos. 6,185,596 and 7,543,011 describe Montgomery multiplication circuits tending to optimize the computing time and current consumption (indeed, Montgomery multiplications being used in encryption, in particular in contactless chip cards, there is also a need to minimize the consumption and, correlatively, the size).

It is therefore desired to minimize the product (response time)×(size) of a Montgomery multiplication circuit.

BRIEF SUMMARY OF THE INVENTION

A method of modular multiplication of two L-bit numbers X an Y by way of an electronic circuit in a processor system is provided, wherein the result of the modular multiplication may be defined from a value XY+mM, where M is the modulo, of L bits, and m is an L-bit number found such that this value is divisible by $2^L$. The method includes performing a main loop of L/k iterations, where k is a number size usable by the processor, an iteration i of the main loop involving the calculation of a term $XY_i+m_iM+R$, where $Y_i$ and $m_i$ are the k-bit digits of rank i of the numbers Y and m starting from the least significant bits, and R is the result of the previous iteration;

in each iteration i:
performing a first sub-loop of k/p iterations, where 1<p<k, organized to calculate a first partial result of the term $XY_i+m_iM+R$ on the k least significant bits of the numbers X, M and R, following a decomposition of numbers X and $m_i$ into p-bit digits;

at the beginning of each iteration of the first sub-loop, simultaneously producing the p bits of the current digit of number $m_i$ by a combinatory logic circuit; and at the end of the first sub-loop, doing a second sub-loop to calculate and add the remaining partial results of term $XY_i+m_iM+R$ using the number $m_i$ established in the first sub-loop.

According to an embodiment, the second sub-loop calculates the remaining partial results of the term $XY_i+m_iM+R$ following a decomposition of numbers X, M and R into p-bit digits.

According to an embodiment, p is chosen so that a binary multiplier of a k-bit operand by a p-bit operand produces a result in less than half a cycle of the processor.

According to an embodiment, the method further includes:
at each iteration j of the first sub-loop, for j going from 0 to k/p-1, updating a k-bit register (S) with the k most significant bits of the sum of the term $X_{(j)}Y_i+m_{(j)}M_{[k-1:0]}$ and the previous content of the register, where $X_{(j)}$ and $m_{(j)}$ are the p-bit digits of rank j of numbers X and $m_i$;

at each iteration j of the second sub-loop, for j going from k/p to L/p,
updating the register (S) with the k most significant bits of the output of an adder receiving the values $X_{(j)}Y_i$, $m_iM_{(j)}$ and the previous content of the register, where $M_{(j)}$ is the p-bit digit of rank j of number M; and producing a p-bit digit of rank j-k/p of the current result R by adding the p least significant bits of the output of the adder and the p-bit digit of rank j of the previous result R;

at the end of the second sub-loop, producing the k most significant bits of the current result R as the content of the register.

A circuit may be provided for calculating a sum of two products, each product having a q-bit binary operand and a k-bit binary operand, where k is a multiple of q, including a q-input Carry-Save Adder (CSA); a multiplexer for each input of the adder, having four k-bit channels respectively receiving the value 0, a first of the k-bit operands, the second k-bit operand, and the sum of the two k-bit operands. The output of a multiplexer of rank t (where t is between 0 and q-1) is taken into account by the adder with a t-bit left shift. Each multiplexer has first and second channel selection inputs, the bits of a first of the q-bit operands being respectively supplied to the first selection inputs, and the bits of the second q-bit operand being respectively supplied to the second selection inputs.

According to an embodiment, the carry-save adder includes two additional k-bit inputs and supplies a dual output in the form of a partial sum and carry sequence, representing a (k+q)-bit result. The circuit includes a k-bit register connected to store the k most significant bits of the output of the adder in the form of a partial sum and carry sequence. The content of the register is supplied to the two additional inputs of the adder. A clock is connected to trigger the update of the register. A control circuit is connected to apply a new pair of q-bit operands to the selection inputs of the multiplexers at each clock cycle.

A system may be provided, including several calculation circuits of the above type connected in a chain, wherein each carry-save adder includes two additional inputs and supplies a dual output in the form of a partial sum and carry sequence, representing a (k+q)-bit result. The k most significant bits of an adder of the chain are supplied, in the form of a partial sum and carry sequence, to the two additional inputs of the next adder of the chain. The selection inputs of the set of multiplexers of each adder receive a different pair of q-bit operands. A k-bit register is connected to store the k most significant bits of the output of the last adder of the chain in the form of a partial sum and carry sequence. The content of the register is supplied to the two additional inputs of the first adder of the chain. A clock is connected to trigger the update of the register. A control circuit is connected to apply a new pair of q-bit operands to the selection inputs of each set of multiplexers at each clock cycle.

According to an embodiment, the system includes a memory location containing a result being calculated; and a complete adder for each carry-save adder, receiving on a first input bits representative of the q least significant bits of the output of the carry-save adder, receiving on a second input q bits from a first position of the memory location, and the output of the complete adder producing q bits written in a second position of the memory location.

According to an embodiment, the system includes registers connected to receive operands from an external memory, the frequency of said clock being chosen at twice the frequency of a clock which clocks the accesses to the external memory. The memory location is an internal memory.

The system may be applied to the modular product calculation of two L-bit numbers X and Y, wherein the result of the modular multiplication may be defined from a value XY+mM, where M is the modulo, of L bits, and m is an L-bit number found such that this value is divisible by $2^L$. The circuit is used for the calculation of an intermediate term $XY_i+m_iM+R$ by iterations at the rhythm of a clock, where $Y_i$ and $m_i$ are the k-bit digits of rank i of numbers Y and m starting from the least significant bits, and R is the sum of the previous terms. The circuit has a first mode where it receives as k-bit operands the number $Y_i$ and the k first bits of number M, and as q-bit operands, q bits of number X and q bits of number $m_i$. The system includes a control circuit arranged to select as q-bit operands, at each iteration, a different pair of q-bit packets of the numbers X and $m_i$. A combinatory logic circuit supplies at each iteration the current q-bit packet of number $m_i$. A first register receives in juxtaposition the q-bit packets of number $m_i$. A second register contains a k-bit value representative of the previous iteration, supplied to two additional inputs of the carry-save adder (CSA) in the form of a partial sum and carry sequence.

According to an embodiment, the circuit has a second mode where it receives as k-bit operands the number $Y_i$ and the number $m_i$ contained in the first register, and as q-bit operands, q bits of the numbers X and M, the control circuit being arranged to select as q-bit operands, at each iteration, a different pair of q-bit packets of the numbers X and M.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

To accelerate the calculation of a modular multiplication of two numbers whose sizes exceed the computing capacity of the processor, it is wished to improve the efficiency of each intermediate calculation, and to organize the intermediate calculations so that all the cycles of the processor are used.

The relationship (1) is equivalent to:

$$R = 2^{-L}(XY + mM), \qquad (3)$$

where m is an L-bit number found such that the L least significant bits of the sum, coded on 2L bits, are null. In other words, R corresponds to the L most significant bits of the sum.

By developing the iterative calculations of the relationship (2), the following is obtained:

$$2LR = XY[0] + m[0]M + 2(XY[1] + m[1]M) + \qquad (4)$$
$$2^2(XY[2] + m[2]M) + \ldots + 2^{L-1}(XY[L-1] + m[L-1]M),$$

and number m of the relationship (3) reveals to be: m=(m[L−1], m[L−2], … m[2], m[1], m[0]).

An intermediate version of this relationship may be rewritten so that one of the operands of each product, which may be referred to as "digit", has a size k higher than one bit, but can still be handled by a processor:

$$2LR = XY0 + m0M + 2^k(XY1 + m1M) + \qquad (5)$$
$$2^{2k}(XY2 + m2M) + \ldots + 2^{(w-1)k}(XYw-1 + mw-1M),$$

where w=L/k, and Yi and mi are k-bit digits of rank i of numbers Y and m. In other words Yi=Y[ki+k−1:ki] and mi=m[ki+k−1:ki].

In a practical example, we can have L=512 and k=64.

This decomposition can be used under the following algorithmic form:

$$R := 0 \quad (6)$$
for i between 0 and w−1 execute:
    find $m_i$ such that $R + XY_i + m_iM$ is divisible by $2^k$
    $R := 2^{-k}(R + XY_i + m_iM)$
end for At each iteration, there is a sum of two products. Each product has a k-bit operand, size adapted to the capacity of the processor, and an L-bit operand, too large for the processor. "Capacity of the processor" refers more to the size of the data bus or memory bus of the processor. Each product can be calculated by the processor by executing a sum of partial products, following the decomposition of the L-bit operand (X and M) into digits which can be processed by the processor (k bits or less). Thus, in each iteration of the algorithm (6), sub-iterations are used to calculate the partial products.

A complication results from the fact that the digit $m_i$ is not known in advance because it depends on the values X, Y and M. The k successive bits of the digit $m_0$, for the first iteration, can be calculated by k iterations according to the algorithm (2), iterations at the end of which the first term $XY_0+m_0M$ is also calculated. By proceeding this way, the algorithm (6) would not bring any improvement with respect to the algorithm (2) in terms of number of iterations.

To decrease the number of iterations, it has been suggested to calculate each digit $m_i$ using a combinatory logic circuit. The result is that k bits of the partial result R can be produced in a single iteration, where k is the size of the digits $m_i$. However, the complexity of the combinatory logic circuit increases with $k^2$. In addition, the response time of the binary multipliers which take the digit $m_i$ as operand increases with k. The result is that the response time of the circuit for calculating the partial result may exceed the cycle time of the processor, making it difficult to use all the clock cycles.

A compromise is suggested here between the size of the circuit for calculating the partial result, its latency, and the reduction of the number of iterations. For that, the size of one of the operands of the binary multipliers is chosen at the maximum capacity of the processor, k, and the size, p, of the other operand is chosen lower than k, preferably a power of 2, so that the partial result calculation circuit executes the calculation in less time than a cycle of the processor.

For the data exchanged on the memory bus for the needs of the calculations to be always of maximum sizes, each operand of a partial product is considered to be of size k, but the calculations are structured so that one or the other operand is split up into p-bit sub-digits and k/p iterations of partial products are executed with a k-bit operand and a p-bit operand, instead of a single product with two k-bit operands. It allows in particular, in a first phase, each digit $m_i$ to be split up into p-bit sub-digits which can be calculated by a combinatory logic circuit of reasonable size. The size p will depend on the manufacturing technology and the clock frequency of the processor.

As an example, it is possible to have p=16 and k=64.

Taking these constraints into account, the inventor has written the algorithm (6) as follows:

$$R := 0 \text{ (L bits)} \quad (7)$$
for i between 0 and w−1 execute:
    $S := R_{[k-1:0]}$ -continued for j between 0 and k/p − 1 execute:
    $m_{i[pj+p-1:pj]} := f(Y_{[p-1:0]}, X_{[pj+p-1:pj]}, M_{[p-1:0]}, R_{[pj+p-1:pj]}, S_{[p-1:0]})$
    $SUM := X_{[pj+p-1:pj]}Y_i + m_{i[pj+p-1:pj]}M_{[k-1:0]} + S$
    $S := SUM_{[64+p-1:p]}$
end for j
for j between k/p and L/p execute:
    $SUM := X_{[pj+p-1:pj]}Y_i + m_iM_{[pj+p-1:pj]} + S$
    $R_{[p(j-k/p)+p-1:p(j-k/p)]} := SUM_{[p-1:0]} + R_{[pj+p-1:pj]}$
    $S := SUM_{[64+p-1:p]}$
end for j
$R_{[L-1:L-k]} := S$
end for I This algorithm has in addition been designed so that the multiplications involved may be executed only by way of adders, in particular Carry-Save Adders CSA.

The algorithm includes a main loop of index i and w=L/k iterations, and two successive sub-loops of indexes j. R is a memory location of at least L bits intended to contain the result of the modular multiplication at the end of the main loop. SUM refers to the output, on k+p bits, of an adder used at each iteration of the sub-loops, and S is a register receiving the k most significant bits of the output SUM.

The first sub-loop is organized to calculate a first partial result of the term $XY_i+m_iM+R$, i.e. $X_{[k-1:0]}Y_i+m_iM_{[k-1:0]}+R_{[k-1:0]}$, sufficient to calculate the k bits of the digit $m_i$. Indeed, when a k-bit number $m_i$ is sought, such that the product $m_iM$ renders the term divisible by $2^k$, the operations required only refer to the k least significant bits of each operand involved in the term. These k bits of the digit $m_i$ are calculated in k/p iterations, each providing by direct calculation (using a combinatory logic circuit) a consecutive p-bit sub-digit of $m_i$, which is stored in a register to be used in the following sub-loop. For the needs of these calculations, the sub-loop scans the digit $m_i$ and the value $X_{[k-1:0]}$ by p-bit digits.

Figure 1A:
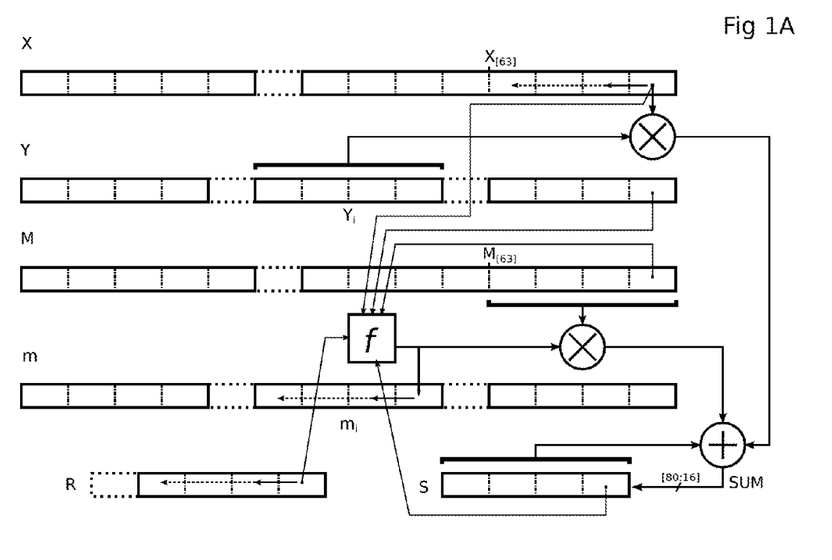
FIGS. 1A and 1B graphically show two sub-loops of a particular Montgomery multiplication algorithm.

FIG. 1A graphically shows the iterations made in the first sub-loop for the iteration i of the main loop, with k=64 and p=16. The numbers are shown in the form of registers divided into blocks of 16 bits. The state shown corresponds to that of the first iteration of the sub-loop. Arrows in solid line to the left refer to the 16-bit digits used at the following iteration. Arrows in dotted line refer to the digits used at the last iteration.

The register S receives the k most significant bits of the output SUM of the adder, the p remaining bits all being null due to the choice of the p bits of $m_i$. The register S contains the first partial result at the end of the sub-loop, to be considered as a 2 k-bit number whose k least significant bits are all null.

$f$ refers to a combinatory logic function which produces p consecutive bits of the digit $m_i$ as a function of five parameters, X, Y, M, S and R (where R is the current content of the memory location having the same name). The function $f$ only needs p bits of each of these parameters, for the same reasons as the digit $m_i$ only needs k bits of each of the operators. An example of circuit implementing this function is subsequently described.

The second sub-loop of index j is used to go on calculating the term $XY_i+m_iM+R$ by partial calculations using the digit $m_i$ calculated in the first sub-loop. The numbers M and X are here split up into p-bit digits. Scanning M and X to form the partial results starts from the position immediately after that reached by the first sub-loop, and the first calculation takes into account the first partial result contained in the register S at the output of the first sub-loop.

Figure 1B:
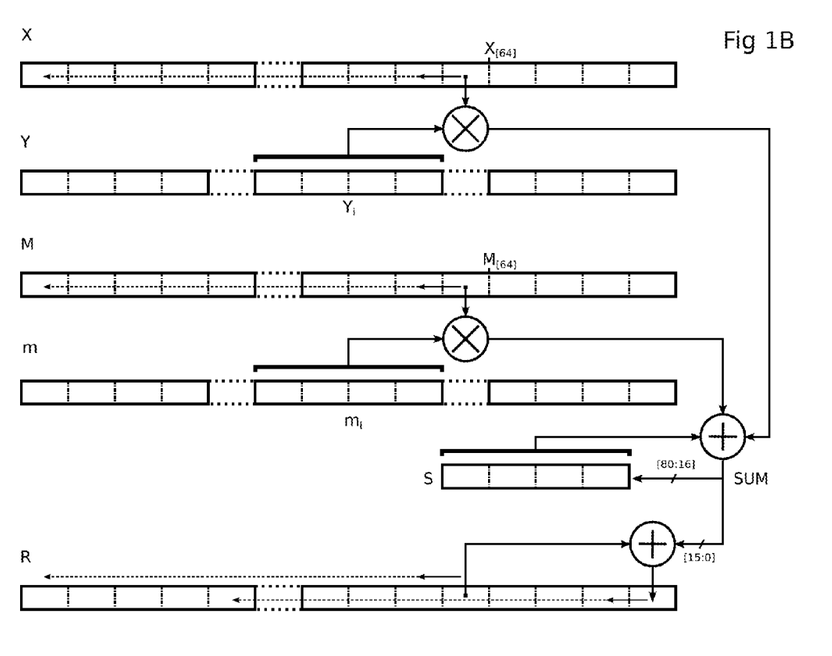

FIG. 1B graphically shows the iterations made in the second sub-loop for the iteration i of the main loop, with k=64 and p=16. The state shown corresponds to that of the first iteration of the sub-loop. As for FIG. 1A, the arrows in solid line to the left refer to the 16-bit digits used at the following iteration. Arrows in dotted line refer to the digits used at the last iteration.

As in the first sub-loop, the k most significant bits of the adder SUM are written in the register S. However, as this time numbers $m_i$ which have been calculated without correlation with the current sub-loop are used, the p least significant bits of the value SUM are not necessarily null. Actually, these p least significant bits are used to reconstruct the current result R by p-bit digits by way of a very simple calculation: the sum of the p least significant bits of the value SUM and of p bits of the previous result R.

At the end of the second sub-loop, the L-k least significant bits of the result R are produced. The k missing most significant bits are then taken into the register S.

The algorithm (7) has been designed, in particular by the choice of p, so that each iteration of the second sub-loop may be done in less than one clock cycle of the processor, as it will be seen hereinafter in relation with a circuit to implement this algorithm.

The modular multiplication calculation algorithms imply many accesses to the memory locations containing the result R being calculated and numbers X, Y and M. Given the size of these numbers, they are conventionally stored in a RAM memory. The result is that many cycles are used for readings and writings in RAM memory.

It has been noted that in each iteration of the main loop of the algorithm (7), i.e. for a given index i, two (k=64)-bit operands remain constant ($m_i$ and $Y_i$). The operand $m_i$ is calculated internally as a function of the needs, and is not written in memory. The operand $Y_i$ is used in a single iteration of the main loop, whereby it must be read once for the whole calculation.

Numbers X and M are completely scanned by 16-bit digits at each iteration of the main loop. In other words, each of these numbers is read L/k times for the whole calculation.

As for the result R being calculated, at each iteration i of the main loop, the whole result R calculated at the iteration i-1 is read, and a new value is written. This corresponds to L/k readings and writings of R for the whole calculation.

In order to decrease the number of memory accesses, it may be considered to store numbers X, M and R in a cache memory internal to the processor. But it would increase the size of the processor too much for many modular multiplication applications considered, in particular for chip cards, where there is a need for a small integrated circuit.

A good compromise has been found by storing only the result R in a memory internal to the processor. Indeed, this result R is accessed in reading and writing, whereas the accesses to the numbers X and M are only read-accesses.

Figure 2A:
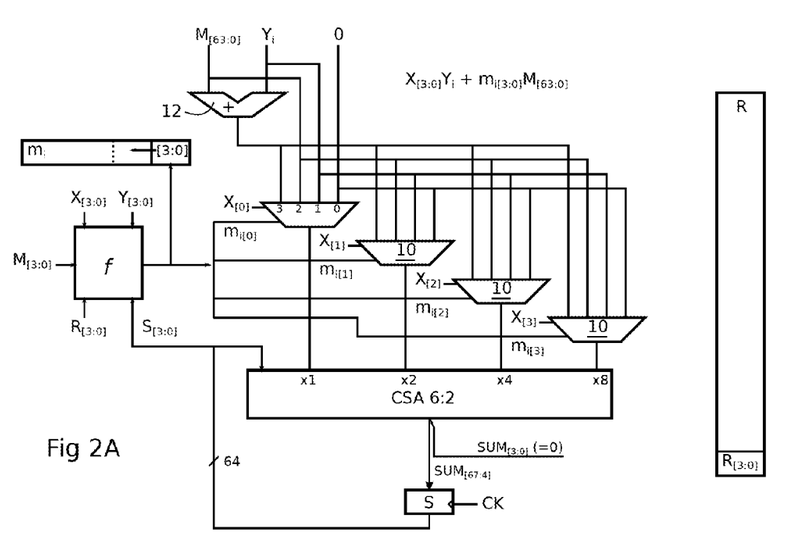
FIGS. 2A and 2B show an embodiment of an elementary Montgomery multiplication circuit in a configurations able to implement the sub-loops of FIGS. 1A and 1B, respectively.

FIG. 2A schematically shows a modular multiplication circuit optimized in a configuration allowing the first sub-loop of the algorithm (7) to be implemented, with k=64 and p=4. The state of the inputs and outputs of the circuit is that corresponding to the first iteration of the sub-loop and to FIG. 1A; it calculates the sum $X_{[3:0]}Y_i+m_{i[3:0]}M_{[63:0]}+S$.

The sum of products $X_{[3:0]}Y_i+m_{i[3:0]}M_{[63:0]}$ is calculated without using any multiplier. To that end, a structure built around a carry-save adder CSA having 6 inputs and two outputs (6:2) is provided. The inputs are defined on 64 bits. The two outputs correspond to the partial sum ps on 64 bits, and to a carry sequence cs on 67 bits. To better understand the operation of the circuits described hereinafter, and to make a comparison with FIGS. 1A and 1B, the two outputs of the adder, i.e., the partial sum ps and the carry sequence cs, are shown by the result SUM they represent, by a single link.

To find the final result of such an adder, a complete sum ps+2cs is executed, which provides a result on 69 bits, included an additional carry bit. Indeed, the sum of 6 64-bit numbers theoretically requires 6−1=5 additional bits to encode the result. Given the properties of the numbers used, in particular since X and Y are lower than M, 68 bits are enough to encode the result.

In reality, the complete sum ps+2cs is never calculated on all the 68 bits in the circuit, which represents a substantial gain in response time. Such a sum is, where it is required, calculated on p=4 bits only.

The 64 most significant bits of the output SUM the adder CSA are written in the register S. This register S is clocked by a clock CK which determines the sequence of the iterations. The output of the register S is reinjected into the adder CSA. It takes two inputs of the adder, since the content of the register S is, in reality, in the same format as the output of the adder, in the form of a partial sum ps and carry sequence cs; more precisely $ps_{[63:4]}$ and $cs_{[67:3]}$ to match the 64 most significant bits of the sum SUM. This corresponds to the configuration of the adder and the register S shown in FIG. 1A. The four least significant bits of the sum SUM are all null in this configuration, since the four bits of $m_i$ are calculated to obtain this result.

The multiplications are made by way of four multiplexers 10 with four 64-bit channels, each connected to one of the remaining inputs of the adder CSA. The four multiplexers receive the same inputs: the output of an adder 12 on an input 3, number $M_{[63:0]}$ on an input 2, number $Y_i$ on an input 1, and 0 on an input 0. The adder 12 receives $M_{[63:0]}$ and $Y_i$.

A multiplexer 10 of rank t (where t is between 0 and 3) is controlled by a pair of bits $(m_{i[4j+t]}, X_{[4j+t]})$ which encodes the number of the input to select, where j is the iteration of the first sub-loop of the algorithm (7) (FIG. 2A corresponds to the iteration j=0). In addition, the output of the multiplexer of rank t is taken into account with a t-bit left shift by the adder CSA. In other words, the output of the multiplexer of rank t is multiplied by $2^t$.

Thus, for example, if $m_{i[3:0]}$=0000 and $X_{[3:0]}$=0000, the four multiplexers select the value 0. The adder CSA produces a null value for the sum of products.

If $m_{i[3:0]}$=1111 and $X_{[3:0]}$=1111, the four multiplexers select the value $Y_i+M_{[63:0]}$. The adder produces $(1+2+4+8)(Y_i+M_{[63:0]})$, i.e. the expected value of $15M_{[63:0]}+15Y_i$.

If $m_{i[3:0]}$=1111 and $X_{[3:0]}$=0000, the four multiplexers select the value $M_{[63:0]}$. The adder produces $(1+2+4+8)M_{[63:0]}=15M_{[63:0]}$.

If $m_{i[3:0]}$=0000 and $X_{[3:0]}$=1111, the four multiplexers select the value $Y_i$. The adder produces $(1+2+4+8)Y_i=15Y_1$.

If $m_{i[3:0]}$=1100 and $X_{[3:0]}$=0011, the first two multiplexers select the value $Y_i$ and the two other multiplexers the value $M_{[63:0]}$. The adder produces $(1+2)Y_i+(4+8)M_{[63:0]}=3Y_i+12M_{[63:0]}$.

It can be checked that all the combinations thus produced by the multiplexers produce in output of the adder CSA the values of the sum of products to calculate.

The bits $m_{i[4j]}$ to $m_{i[4j+3]}$ are simultaneously calculated by a combinatory logic circuit f receiving the quadruples $Y_{[3:0]}$, $X_{[4j+3: 4j]}$, $M_{[3:0]}$, $R_{[4j+3:4j]}$, and $S_{[3:0]}$.

The four bits $S_{[3:0]}$ are the four least significant bits of the value represented by the register S, i.e. the value $SUM_{[7:4]}$ of the previous iteration, or, to be more accurate, the pair of values $ps_{[7:4]}$ and $cs_{[6:3]}$ provided by the adder CSA at the previous iteration.

The four bits $R_{[4j+3:4j]}$ are taken from a memory R of L bits, which is, as previously mentioned, integrated into the processor, and whose use will be described in relation with FIG. 2B.

The 4 bits provided by the circuit $f$ are stacked in a register After 16 cycles of clock CK, the 64 bits of the number $m_i$ to be calculated will be written in the register $m_i$. The second sub-loop of the algorithm, implemented by the circuit of FIG. 2B, is then entered.

Figure 2B:
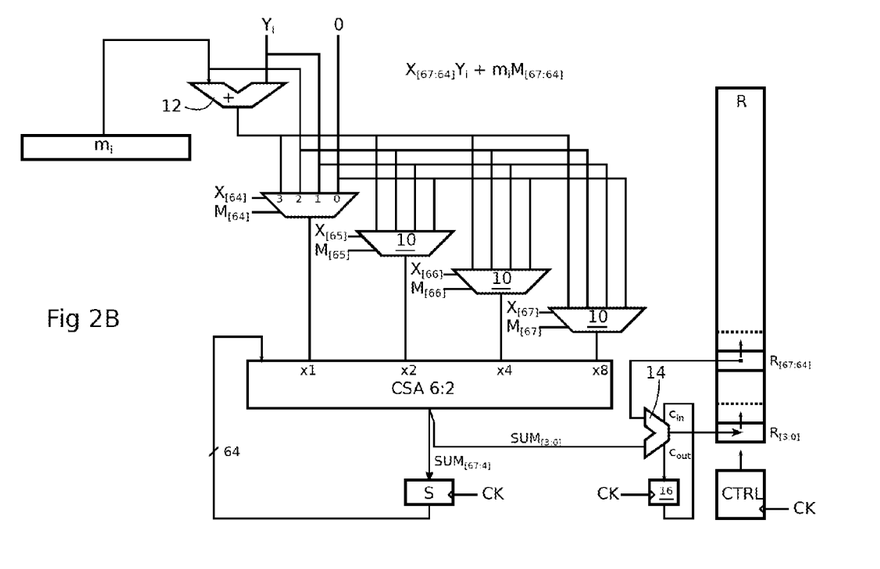

FIG. 2B shows the structure of FIG. 2A, in which two of the operands have changed. The state of the inputs and outputs of the circuit is that corresponding to FIG. 1B, at the first iteration of the second sub-loop; the circuit calculates the sum $X_{[67:64]}Y_im_iM_{[67:64]}+S$. The first input of the adder 12 and the inputs of rank 2 of the multiplexers 10 receive the 64-bit value $m_i$ stored in the register having the same name. The pair of selection bits for a multiplexer of rank t is $(M_{[4j+t]}, X_{[4j+t]})$, where j is the iteration index of the second sub-loop, which starts at the value 16 in this example.

The value $m_i$ calculated and stored, the circuit $f$ of FIG. 2A is no longer used. However, the aim is now to update the memory R. It is done with an adder 14 which receives the 4 least significant bits from the output SUM of the adder CSA and the four bits of ranks 64 to 67 (for the first iteration) from the memory R. Considering the output of the adder in the form of a partial sum ps and carry sequence cs, the four least significant bits of the output SUM correspond to the values $ps_{[3:0]}$ and $2cs_{[2:0]}$ which are added by the adder 14. The four output bits of the adder 14 are written to the ranks 0 to 3 (for the first iteration) in the memory R. The carry digit $c_{out}$ of the sum is stored in a flip-flop 16 clocked by the clock CK. The content of this flip-flop powers the carry input $c_{in}$ of the adder 14 for the next iteration.

At each iteration or clock pulse CK, a control circuit CTRL shifts by four bits towards the most significant bits the locations of the memory R used as input and output for the adder 14. The control circuit also organizes the selection of the pairs of bits to apply to the selection inputs of the multiplexers 10 at each clock pulse, which is also done in the configuration of FIG. 2A.

Figure 3:
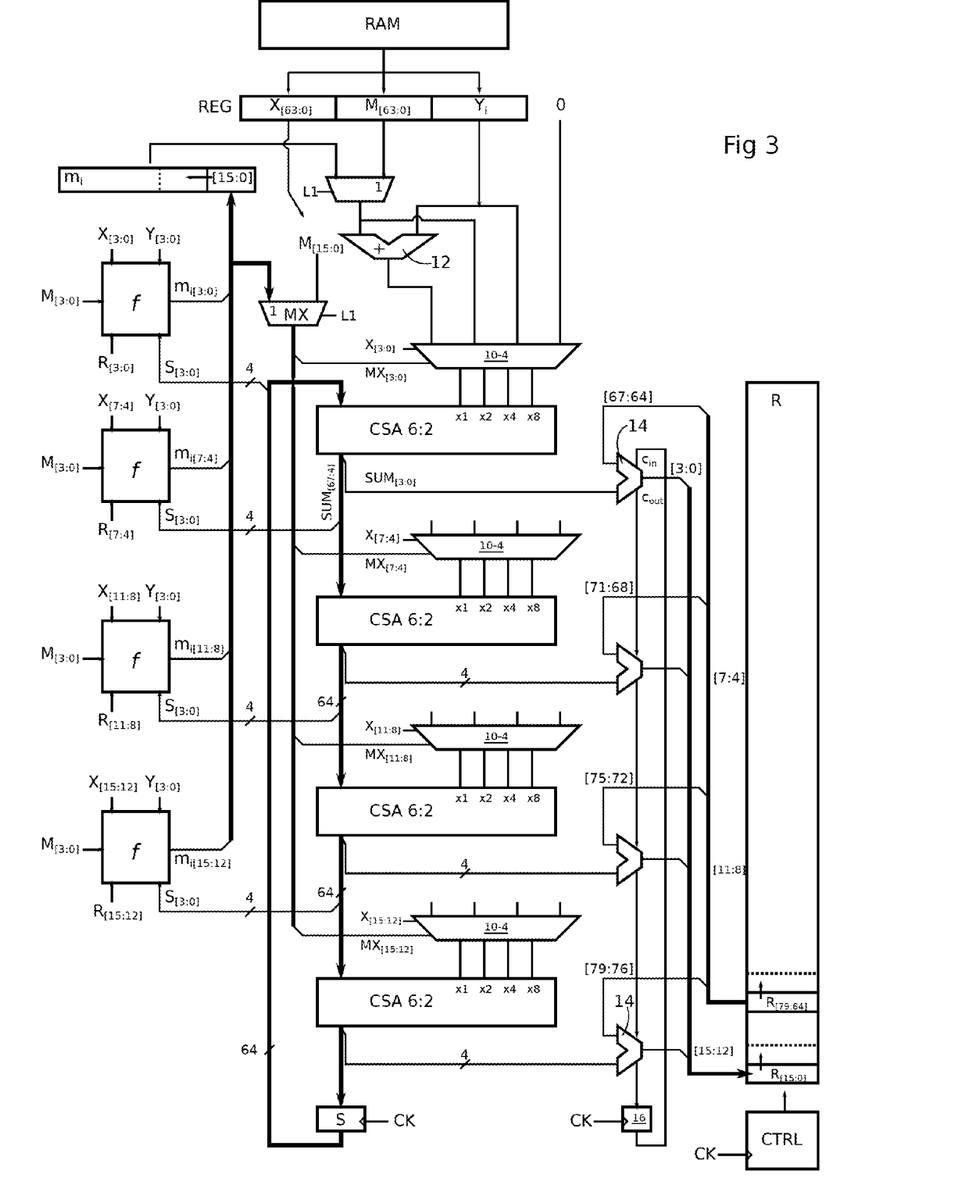
FIG. 3 shows an embodiment of the Montgomery multiplication circuit made by putting several elementary circuits of the type of FIGS. 2A and 2B in cascade.

FIG. 3 shows a circuit allowing number $m_i$ to be calculated and the memory R to be updated by packets of 16 bits by clock pulse. It is made by connecting four circuits of the type of FIGS. 2A and 2B in cascade. It includes four adders CSA, each of which is associated with four multiplexers 10 (which are shown gathered under the reference 10-4) receiving the same inputs, to an adder 14, and to a combinatory calculation circuit $f$ of 4 corresponding bits of number $m_i$. Each adder CSA receives the 64 most significant bits of the output of the previous adder. The first adder CSA receives the 64 most significant bits of the output of the last adder through the register S.

The multiplexers 10-4 are controlled by respective successive quadruples of numbers $m_i$ or M, and X. The choice of number $m_i$ or M to control the multiplexers is made by a multiplexer with two 16-bit channels MX as a function of a signal L1 indicating by a "1" that the circuit operates in the first sub-loop, and by a "0" that the circuit operates in the second sub-loop. This multiplexer MX receives on a first channel, selected when L1=1, the 16 bits of number $m_i$, produced in parallel by the circuits f, and on a second channel the 16 corresponding bits of number M.

A multiplexer 18 with two 64-bit channels provides the adder 12 with the 64 least significant bits of number M when L1=1, and 64-bit number $m_i$ contained in the register having the same name when L1=0.

The digits being worked on of numbers X, Y and M are stored in 64-bit internal registers REG, whose content is renewed by a 64-bit bus from an external memory RAM as a function of the needs. The values shown, i.e., $X_{[63:0]}$, $Y_i$ and $M_{[63:0]}$, are those used by the four iterations of the first sub-loop for an iteration i of the main loop.

The value $Y_i$ is kept, from the first iteration of the second sub-loop, starting with an index j=4, but the 64 following bits of numbers X and M are loaded, i.e. $X_{[127:64]}$ and $M_{[127:64]}$, which will be used on 4 iterations of the second sub-loop.

Each adder 14 provides a respective quadruple of a newly calculated 16-bit packet of number R, and receives for that a respective quadruple of an old 16-bit packet contained in the memory R. The adders 14 are chained by their carry inputs and outputs. The carry output of the last adder 14 is stored in the flip-flop 16, whose content is supplied to the carry input of the first adder 14.

During the iterations of the first sub-loop, the update of the memory R is deactivated. The four least significant bits of the output of the adders CSA being null during this phase, the adders 14 do not supply useful results. The intermediate result being used after the calculations is in the register S and propagated by the adders CSA.

At the first iteration of the second sub-loop, the four adders 14 produce the value $R_{[15:0]}$ which is written in the 16-bit location of rank 0 of the memory R. This value is calculated by the adders 14 from the content read at the location of rank 4 of the memory, i.e. the previous value $R_{[79:64]}$.

At the following iteration, the pointer PTR shifts the reading and writing locations of the memory R by 16 bits to the most significant bits, as indicated by the arrows.

As previously indicated, at the last iteration, the 64 most significant bits of the result are missing in the memory R. These 64 bits are taken from the register S. To that end, a conversion on 64 bits of the CSA format is made here in binary (ps+2cs), once by iteration of the main loop.

Thus, a circuit of the type of FIG. 3, after 4 reset cycles to calculate the 64 bits of number $m_i$, produces 16 bits of the result R by cycle, from 16 corresponding bits of each number X, $Y_i$ and M. In other words, new values cannot be loaded into the registers REG as long as 64 bits of the result R are not produced. 4 cycles are needed to produce the 64 bits of the result R, whereas two cycles are enough to renew the required contents of the registers. Indeed, with the algorithmic choices made here to split up the operations, and the fact of storing R in an internal memory, only the packets of X and M need to be renewed, the value $Y_i$ remaining constant for all the iterations of the two sub-loops. The result is an exploitation of 50% only of the bandwidth of the memory bus.

There is therefore a need for producing 32 bits of the result R by reading cycle of the memory RAM. To that end, it could be considered to spread the capacity of the circuit of FIG. 3 to 32 bits by cycle by doubling the number of stages. That would double the occupied surface of an already complex circuit. In addition, the response time of the circuit, increasing faster than the surface, may exceed one clock cycle, which would reintroduce the problem.

In fact, the choices shown in FIG. 3 are the result of a good compromise between size and speed, and consumption and speed. In the considered applications, in particular for contactless chip cards operating with a clock around ten MHz, the circuit produces its calculation in less than half a clock cycle.

It is suggested to double the operating frequency of the circuit in relation to the clock frequency of the memory bus. In other words, the clock CK shown in FIG. 3 has a frequency which is twice the frequency which clocks the transfers with the memory RAM, referred to as $CK_{RAM}$. In this case, the circuit produces two successive 16-bit packets, i.e., 32 bits, in one memory cycle, so that all the memory cycles are busy.

Figure 4:
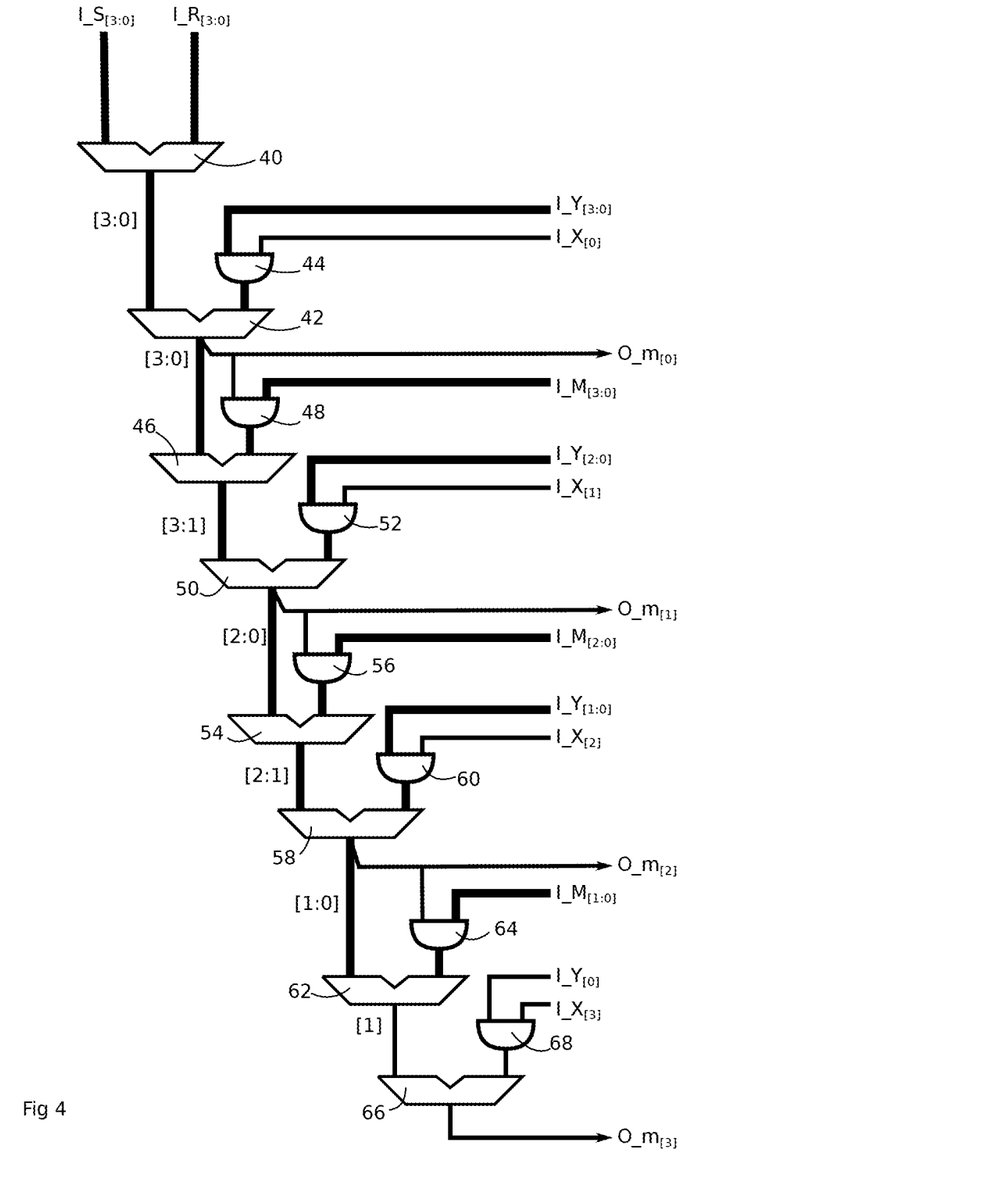
FIG. 4 shows an example of combinatory logic circuit allowing 4 bits of number m to be produced.

FIG. 4 schematically shows a detailed example of circuit $f$. The inputs of four bits corresponding to the parameters X, Y, M, R and S are respectively referred to as I_X, I_Y, I_M, I_R, and I_S. The output producing the four required bits of number m is referred to as O_m.

The circuit includes a complete 4-bit adder 40 receiving the four bits of each of the inputs I_S and I_R. The four output bits of this adder 42 (the carry bit is ignored) are supplied to a first input of an adder 42. A second input of the adder 42 receives the product of each of the bits of the input I_Y by the bit $I\_X_{[0]}$. This product is obtained by 4 AND gates shown gathered into a single gate. The first bit of the output O_m is the least significant bit of the output of the adder 42.

The four output bits of the adder 42 (the carry bit is ignored) are supplied to a first input of an adder 46. A second input of the adder 46 receives the product of each of the bits of the input I_M by the bit $O\_m_{[0]}$, executed by a group 48 of four AND gates.

The three most significant bits of the output of the adder 46 are supplied to a first input of a 3-bit adder 50. A second input of the adder 50 receives the product of the three least significant bits of the input I_Y by the bit $I\_X_{[1]}$, executed by a group 52 of three AND gates. The second bit of the output O_m is the least significant bit of the output of the adder 50.

The three output bits of the adder 50 (the carry bit is ignored) are supplied to a first input of a 3-bit adder 54. A second input of the adder 54 receives the product of the three least significant bits of the input I_M by the bit $O\_m_{[1]}$, executed by a group 56 of three AND gates.

The two most significant bits of the output of the adder 54 are supplied to a first input of a 2-bit adder 58. A second input of the adder 58 receives the product of the two least significant bits of the input I_Y by the bit $I\_X_{[2]}$, executed by a group 60 of three AND gates. The third bit of the output O_m is the least significant bit of the output of the adder 58.

The two output bits of the adder 58 (the carry bit is ignored) are supplied to a first input of a 2-bit adder 62. A second input of the adder 62 receives the product of the two least significant bits of the input I_M by the bit $O\_m_{[2]}$, executed by a group 64 of two AND gates.

The most significant bit of the output of the adder 62 is supplied to a first input of a 1-bit adder 66. A second input of the adder 66 receives the product of the least significant bit of the input I_Y by the bit $I\_X_{[3]}$, executed by an AND gate 68. The fourth and last bit of the output O_m is the outgoing bit of the adder 58.

Many variations and modifications of the embodiments described here will clearly appear to those skilled in the art. For example, the structure of the product sum calculation circuit of FIGS. 2A and 2B, based on an adder CSA and multiplexers, may be generalized to use q-bit instead of 4-bit operands to control the multiplexers. q multiplexers are then provided, all receiving the same four inputs as those described in relation with FIG. 2A or 2B, and whose outputs power a (q+2)-input adder CSA. The output of the multiplexer of rank t (t between 0 and q−1) is taken into account with t-bit left shift by the adder CSA.

Preferably, q is a multiple of 4. With q=8, for example, the circuit of FIG. 3 has only two stages, each of which is associated to a circuit $f$ producing 8 bits of number $m_i$, and to an adder 14 producing 8 bits of number R.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A circuit for calculating a sum of two products, each product having a q-bit binary operand and a k-bit binary operand, where k is a multiple of q, the circuit comprising:
    a q-input Carry-Save Adder;
    a multiplexer for each input of the adder, having four k-bit channels respectively receiving the value 0, a first of the k-bit operands, the second k-bit operand, and the sum of the two k-bit operands, wherein the output of a multiplexer of rank t (where t is between 0 and q−1) is taken into account by the adder with a t-bit left shift, and
    each multiplexer having first and second channel selection inputs, the bits of a first of the q-bit operands being respectively supplied to the first selection inputs, and the bits of the second q-bit operand being respectively supplied to the second selection inputs.

2. The circuit of claim 1, wherein the carry-save adder comprises two additional k-bit inputs and supplies a dual output in the form of a partial sum and carry sequence, representing a (k+q)-bit result, the circuit further comprising:
    a k-bit register connected to store the k most significant bits of the output of the adder in the form of a partial sum and carry sequence, the content of the register being supplied to the two additional inputs of the adder;
    a clock connected to trigger the update of the register; and
    a control circuit connected to apply a new pair of q-bit operands to the selection inputs of the multiplexers at each clock cycle.

3. A circuit comprising a plurality of calculation circuits according to claim 1 connected in a chain, wherein:
    each carry-save adder comprises two additional inputs and supplies a dual output in the form of a partial sum and carry sequence, representing a (k+q)-bit result;
    the k most significant bits of an adder of the chain are supplied, in the form of a partial sum and carry sequence, to the two additional inputs of the next adder of the chain;
    the selection inputs of the set of multiplexers of each adder receive a different pair of q-bit operands;
    a k-bit register is connected to store the k most significant bits of the output of the last adder of the chain in the form of a partial sum and carry sequence, the content of the register being supplied to the two additional inputs of the first adder of the chain;
    a clock is connected to trigger the update of the register; and
    a control circuit is connected to apply a new pair of q-bit operands to the selection inputs of each set of multiplexers at each clock cycle.

4. The circuit of claim 3, further comprising:
    a memory location containing a result being calculated; and
    a complete adder for each carry-save adder, receiving on a first input bits representative of the q least significant bits of the output of the carry-save adder, receiving on a second input q bits from a first position of the memory location (R), and the output of the complete adder producing q bits written in a second position of the memory location.

5. The circuit of claim 4, further comprising registers connected to receive operands from an external memory, the frequency of said clock being chosen at twice the frequency of a clock which clocks the accesses to the external memory, said memory location being an internal memory.

6. The circuit of claim 1, applied to the modular product calculation of two L-bit numbers X and Y, wherein the result of the modular multiplication may be defined from a value XY+mM, where M is the modulo, of L bits, and m is an L-bit number found such that this value is divisible by $2^L$, the circuit being used for the calculation of an intermediate term $XY_i$+ $m_i$M+R by iterations at the rhythm of a clock, where $Y_i$ and $m_i$ are the k-bit digits of rank i of numbers Y and m starting from the least significant bits, and R is the sum of the previous terms, the circuit having a first mode where it receives as k-bit operands the number $Y_i$ and the k first bits of number M, and as q-bit operands, q bits of number X and q bits of number $m_i$, the circuit further comprising:
- a control circuit arranged to select as q-bit operands, at each iteration, a different pair of q-bit packets of the numbers X and mi;
- a combinatory logic circuit supplying at each iteration the current q-bit packet of number mi;
- a first register receiving in juxtaposition the q-bit packets of number mi; and
- a second register containing a k-bit value representative of the previous iteration, supplied to two additional inputs of the carry-save adder in the form of a partial sum and carry sequence.

7. The circuit of claim 6, having a second mode where it receives as k-bit operands the number $Y_i$ and the number $m_i$ contained in the first register, and as q-bit operands, q bits of the numbers X and M, the control circuit being arranged to select as q-bit operands, at each iteration, a different pair of q-bit packets of the numbers X and M.

8. The circuit of claim 1, wherein q=4 and k=64.

* * * * *